United States Patent
Ganesan et al.

(10) Patent No.: US 9,716,802 B2
(45) Date of Patent: Jul. 25, 2017

(54) CONTENT MODEL FOR A PRINTER INTERFACE

(75) Inventors: Kumaravel Ganesan, Dindigul TamilNadu (IN); Deepak Ramachandran, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 969 days.

(21) Appl. No.: 13/445,479

(22) Filed: Apr. 12, 2012

(65) Prior Publication Data

US 2013/0271783 A1   Oct. 17, 2013

(51) Int. Cl.
 *H04N 1/00* (2006.01)
 *G06F 3/12* (2006.01)

(52) U.S. Cl.
 CPC ....... *H04N 1/00464* (2013.01); *G06F 3/1204* (2013.01); *G06F 3/1271* (2013.01); *G06F 3/1287* (2013.01); *H04N 1/0044* (2013.01); *H04N 1/00973* (2013.01); *H04N 1/0023* (2013.01); *H04N 1/00233* (2013.01); *H04N 2201/0082* (2013.01)

(58) Field of Classification Search
 CPC ..... G06F 3/1204; G06F 3/1271; G06F 3/1287
 USPC ................................ 358/1.13, 1.15
 See application file for complete search history.

(56) References Cited

U.S. PATENT DOCUMENTS

| | | | |
|---|---|---|---|
| 6,529,214 B1 | 3/2003 | Chase et al. | |
| 6,940,614 B2 | 9/2005 | Subramaniam | |
| 7,046,384 B2 | 5/2006 | Ferlitsch et al. | |
| 7,408,667 B2 | 8/2008 | Ferlitsch | |
| 7,409,434 B2 | 8/2008 | Lamming et al. | |
| 7,424,459 B2 | 9/2008 | Bodmer et al. | |
| 7,538,899 B2 | 5/2009 | Kawaoka | |
| 7,634,541 B2 | 12/2009 | Chen et al. | |
| 7,779,108 B2 | 8/2010 | Kawai | |
| 7,797,349 B2 | 9/2010 | Kosaka | |
| 7,924,452 B2 | 4/2011 | Matsuda | |
| 8,095,376 B2 | 1/2012 | Gombert et al. | |
| 8,239,239 B1 | 8/2012 | Malhotra et al. | |

(Continued)

FOREIGN PATENT DOCUMENTS

| | | |
|---|---|---|
| JP | 2003108345 A | 4/2003 |
| JP | 2007328639 A | 12/2007 |

OTHER PUBLICATIONS differencebetween.net, "Difference Between Google and iGoogle," Oct. 21, 2009, (Web Page), available at http://web.archive.org/web/20091021203910/http://www.differencebetween.

(Continued)

*Primary Examiner* — Tammy Paige Goddard
*Assistant Examiner* — Bharatkumar Shah
(74) *Attorney, Agent, or Firm* — Fabian VanCott

(57) ABSTRACT

A method includes, with a physical computing system, executing a navigational application for a printer interface of a printer connected to the physical computing system through a network, with the physical computing system, using a content model for the navigational application, the content model defining attributes and a category for a screen. The method further includes, with the physical computing system, receiving content associated with the category, and with the physical computing system, providing to the printer the screen and the content in a format that is executable by the printer.

20 Claims, 5 Drawing Sheets

(56) References Cited

U.S. PATENT DOCUMENTS

| | | |
|---|---|---|
| 2002/0120742 A1 | 8/2002 | Cherry |
| 2002/0191210 A1 | 12/2002 | Staas et al. |
| 2002/0191211 A1 | 12/2002 | Miller et al. |
| 2003/0084449 A1 | 5/2003 | Chane et al. |
| 2003/0115548 A1 | 6/2003 | Melgar |
| 2003/0172141 A1 | 9/2003 | Miller et al. |
| 2004/0085366 A1 | 5/2004 | Foster et al. |
| 2004/0227960 A1 | 11/2004 | Farros et al. |
| 2004/0230447 A1 | 11/2004 | Schwerin-Wenzel et al. |
| 2005/0083548 A1 | 4/2005 | Suga et al. |
| 2005/0132094 A1 | 6/2005 | Wu |
| 2006/0085781 A1 | 4/2006 | Rapp et al. |
| 2007/0050750 A1 | 3/2007 | Bykov et al. |
| 2007/0198656 A1 | 8/2007 | Mazzaferri et al. |
| 2008/0037062 A1 | 2/2008 | Omino et al. |
| 2008/0082923 A1 | 4/2008 | Ferlitsch |
| 2008/0137133 A1 | 6/2008 | Trappe |
| 2008/0270597 A1 | 10/2008 | Tenenti |
| 2009/0063718 A1 | 3/2009 | Sekine et al. |
| 2009/0190150 A1 | 7/2009 | Selvaraj et al. |
| 2009/0217188 A1 | 8/2009 | Alexander et al. |
| 2009/0326684 A1 | 12/2009 | Wang et al. |
| 2010/0079804 A1 | 4/2010 | Otsuka |
| 2011/0026071 A1 | 2/2011 | Xiao et al. |
| 2011/0032562 A1* | 2/2011 | McCuen ............... G06F 3/1205 358/1.15 |
| 2011/0041052 A1 | 2/2011 | Fraisl |
| 2011/0188063 A1* | 8/2011 | Nuggehalli ........... G06F 3/1236 358/1.13 |
| 2011/0255123 A1 | 10/2011 | Refstrup et al. |
| 2011/0258549 A1 | 10/2011 | Chapple et al. |
| 2011/0267633 A1 | 11/2011 | Srinivasmurthy et al. |
| 2011/0276945 A1 | 11/2011 | Chasman et al. |

OTHER PUBLICATIONS

Wikipedia, "iGoogle," (Web Page), Nov. 20, 2009, available at http://web.archive.org/web/20091120065654/http://en.wikipedia.org/wiki/IGoogle.

Wikipedia, "Yahoo!," (Web Page), Aug. 30, 2009, available at http://web.archive.org/web/20090830065732/http://en.wikipedia.org/wiki/Yahoo!.

* cited by examiner

CONTENT MODEL FOR A PRINTER INTERFACE

BACKGROUND

Some modern printers are designed with smaller processing capabilities to keep costs to the consumer relatively low. Instead of relying on complex local processing hardware, such printing systems are designed to rely on processing performed by a cloud computing system. The printer itself is generally designed to execute a specific type of code to provide a user with a user interface panel. This executable code may be in a format such as an eXtensible Markup Language (XML) format.

In such printing systems, a specific navigational application runs on the cloud computing system. That navigational application manages what is displayed to a user on the user interface of that printer. The navigational application sends executable code to be executed by the firmware on the printing system. The printing system executes that code to display the appropriate images to the user. As the user interacts with the user interface of the printer, the printer sends the navigational application information relating to the user's inputs.

The user may interact with the user interface to browse content that can be printed by the printer. Sometimes, this content may be provided by third party providers. In such cases, the navigational application for a specific printer is designed to accept content that is specifically and statically modeled for viewing on the printer. Thus, the content provider does not have much freedom to determine how the content is displayed to a user through the printer's user interface.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

Figure 1:
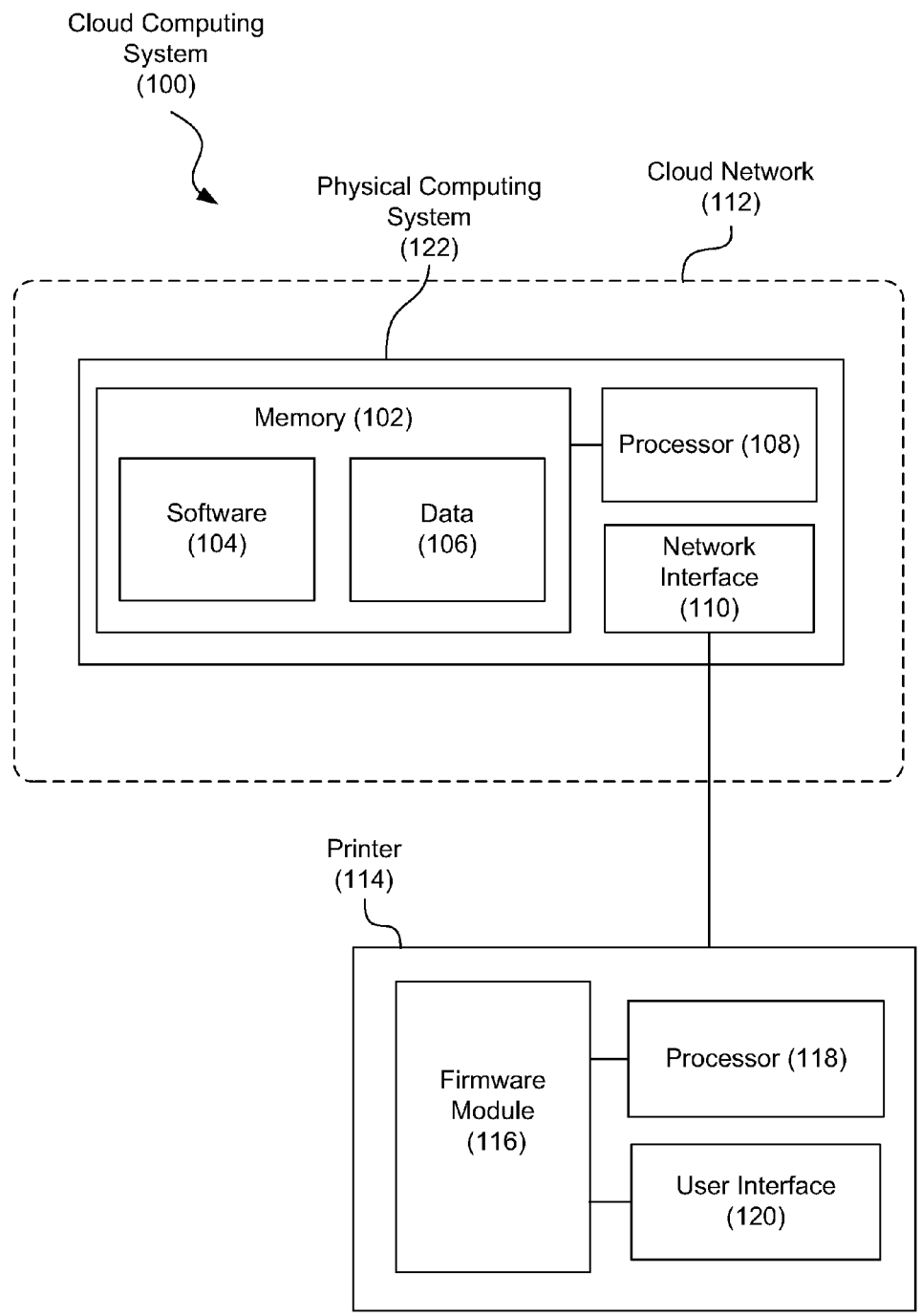
FIG. 1 is a diagram showing an illustrative cloud computing system, according to one example of principles described herein.

As mentioned above, a user may interact with the user interface of a printer to browse content that can be printed by the printer. Sometimes, this content may be provided by third party providers. In such cases, the navigational application for a specific printer is designed to accept content that is specifically and statically modeled for viewing on the printer. Thus, the content provider does not have much freedom to determine how the content is displayed to a user through the printer's user interface.

In light of this and other issues, the present specification discloses methods and systems for providing a dynamic content model for display on cloud based printing systems. According to certain illustrative examples, the dynamic model includes a model of a set of screens that can be defined by the content provider. Each screen includes attributes, pre-condition scripts, post-condition scripts, and one or more content categories. The attributes may be the name of the screen or an identification number for the screen. The pre-condition scripts determine what has to occur before the screen can be displayed. For example, the pre-condition scripts may require authentication from a user before displaying the screen. The post-condition scripts determine what happens after display of the screen has ended. For example, a post-condition script may determine what screen is to be displayed next.

In the dynamic content model, a content category can also include attributes, pre-condition scripts, and post-condition scripts. Thus, the content provider can specify such characteristics to each content category. In some cases, the content category may be structured as a tree. In some cases, a single category of printable content is displayed. In order to view other content categories, a user may have to navigate to a different screen also defined by the content model. The post-condition scripts may indicate the next screen to be navigated to according to user inputs that are sent back to the navigational application.

Through use of methods and systems embodying principles described herein, content providers can format content according to a dynamic model that provides the user with dynamic navigation through that content. Thus, the content is not limited to providing content according to a static structure. This allows content providers with more freedom to provide content to users in a manner that best fits the objectives of the content provider.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram showing an illustrative cloud computing system (100). FIG. 1 illustrates an example of a physical computing system (122) within a cloud network (112) and a printer connected to that physical computing system (122) through the cloud network (112). According to certain illustrative examples, the physical computing system (122) includes a memory (102) having software (104) and data (106) stored thereon. Software refers to any set of machine readable instructions. The physical computing system (122) also includes a processor (108) and a network interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) stored in memory (102). The software (104) may include an operating system. An operating system allows other applications to interact properly with the hardware of the physical computing system. Such other applications may include a navigational application for a printer (114) that relies on the cloud computing system (100) for operation.

The network interface (110) allows the physical computing system (122) to communicate with other physical computing systems, including the printer (114). The printer includes its own network interface (not shown). The network interface (110) can communicate with other devices through a variety of technologies including Ethernet, coaxial, fiber optic, or wireless.

The printer (114) includes a firmware module (116) a processor (118) and a printer interface (120). As mentioned above, some printers are designed with a small amount of hardware and are thus not capable of processing the software for a user interface (120). Thus, the printer relies on computing services provided by the cloud computing system (100). Specifically, the navigational application used to run the user interface (120) is processed on a physical computing system within the cloud network (112). That physical computing system then sends information to the printer (114) formatted specifically for the firmware module (114) of that printer. The firmware module (116) is capable of the basic processing used to display the appropriate images on the user interface (120). The firmware module (116) also receives user input and reports that input back to the navigational application running on the cloud network (112). Throughout this specification and in the appended claims, the term "firmware" refers to machine readable instructions.

Figure 2:
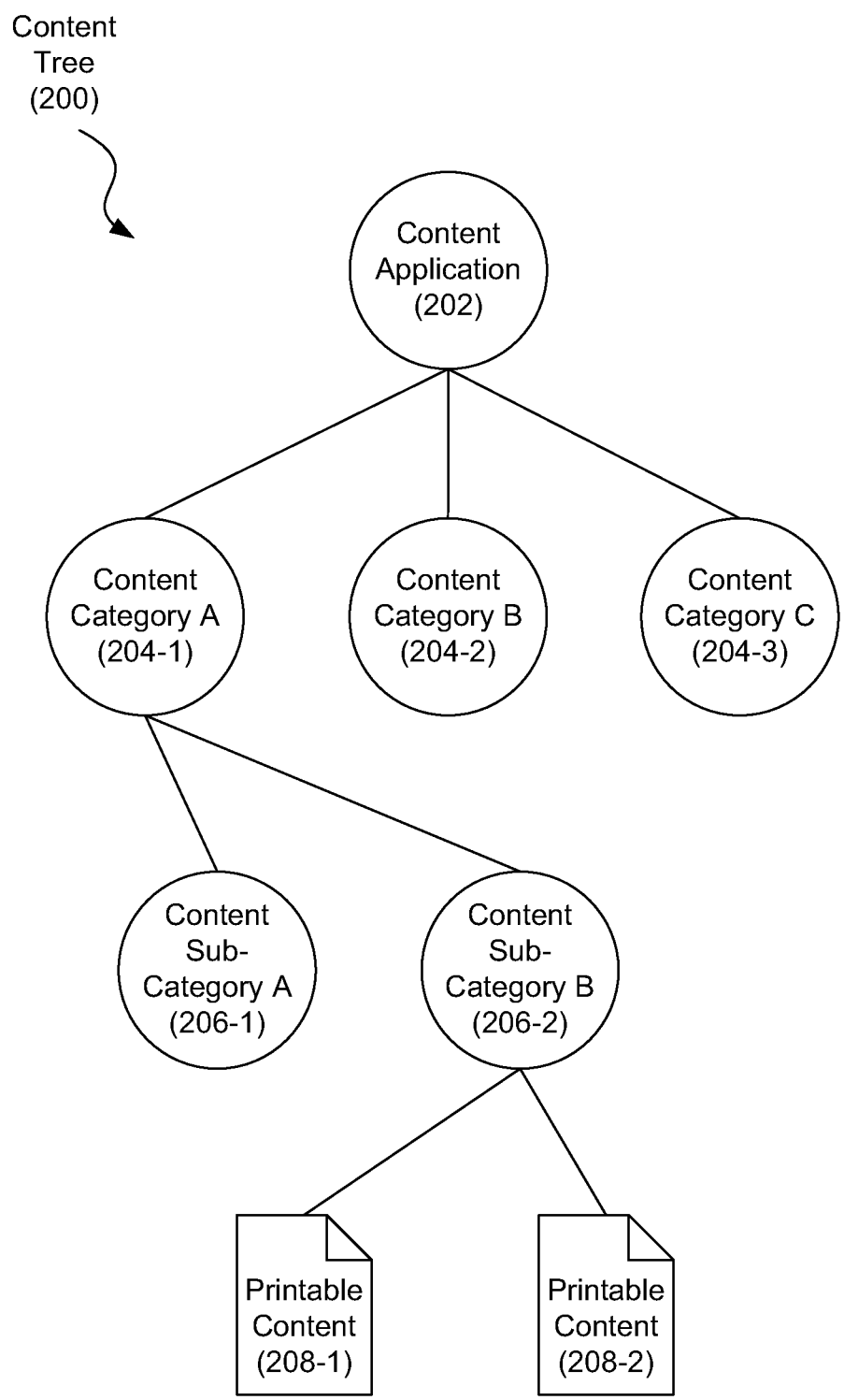
FIG. 2 is a diagram showing an illustrative content tree, according to one example of principles described herein.

FIG. 2 is a diagram showing an illustrative content tree (200), according to one example of principles described herein. As mentioned above, printing systems may allow content providers to display content for printing on the printer. The navigational application associated with the printer is typically designed to accept content for display in a static manner. Specifically, the content provider provides a tree structure of the printable content.

According to certain illustrative examples, the root of the static content tree indicates the content application (202). The content application may be specific to a particular type of content or a particular content provider. The content provider then provides a number of content categories (204). These content categories may also include sub-categories (206). The sub-categories may then include a set of printable content files (208).

With such a static content tree, a user may be provided with a home page associated with the content application (202). The user then has the option to choose one of the several content categories (204) associated with the content application (202). In this example, the user may choose either content category A (204-1), content category B (204-2), or content category C (204-3). If the user selects content category A (204-1), then the user will be provided with a new screen that displays content sub-category A (206-1) and content sub-category B (206-2). If the user then selects content sub-category B (206-2), then the user may be provided with a display of printable content file 1 (208-1) and printable content file 2 (208-2). The user may also navigate back up the tree and down other branches to view various pieces of printable content.

Using such a model, the content provider is only able to provide a static navigational experience to the user. This limits the content provider's ability to customize the manner in which the content is displayed to the user. In light of this issue, the present specification discloses a dynamic content model that allows content providers to more effectively customize the manner in which content is displayed to a user. This provides users with a better navigational experience from various content providers.

Figure 3:
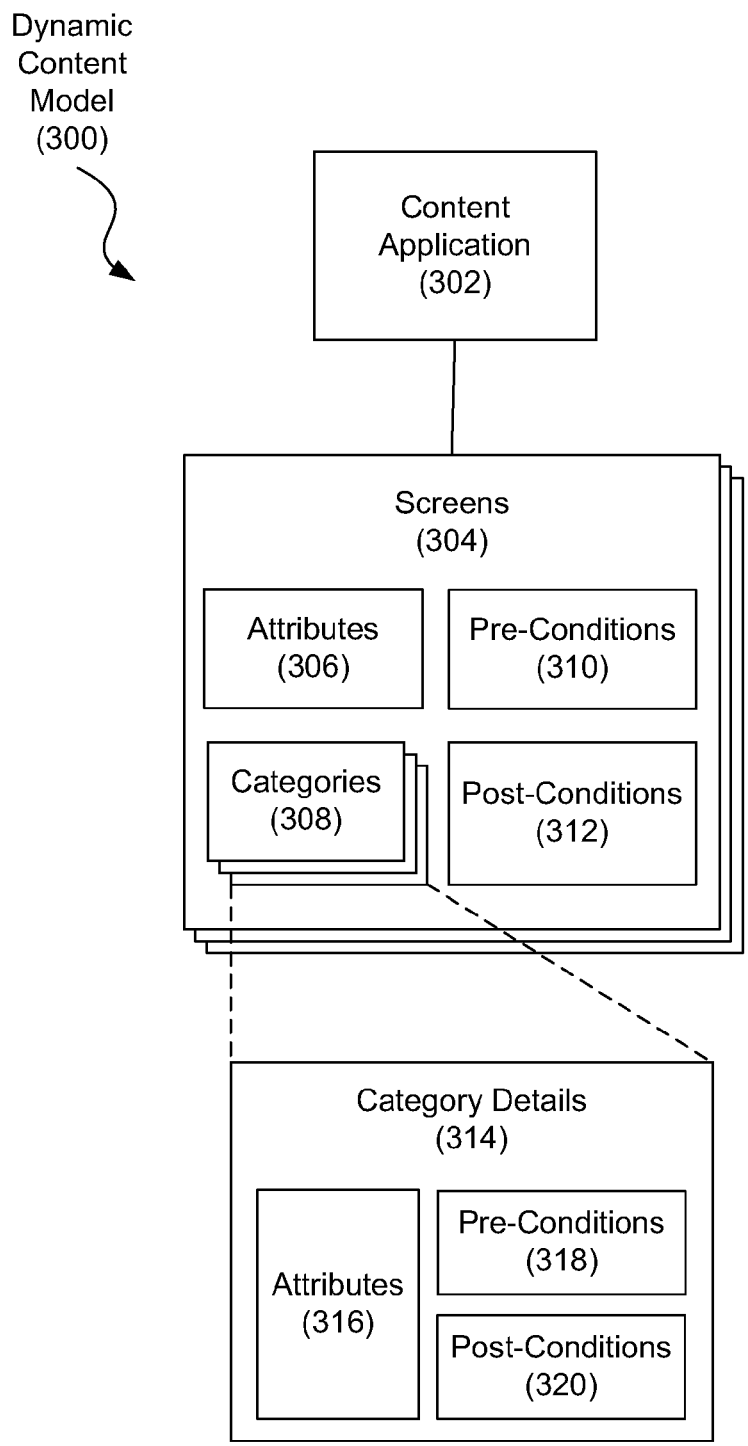
FIG. 3 is a diagram showing an illustrative dynamic content model, according to one example of principles described herein.

FIG. 3 is a diagram showing an illustrative dynamic content model (300). According to certain illustrative examples, the content application (302) is associated with a number of screens (304). One screen may be dedicated to be the default screen that is first displayed to a user. A screen (304), including the default screen, includes attributes (306), a set of one or more categories, pre-conditions scripts (310), and post-condition scripts (312). Thus, the content provider is allowed to define these characteristics of various screens.

The content provider may define attributes (306) for a screen such as a name of the screen or an identification number for that screen. The attributes may also include background colors, and other display related information. Different dynamic content models may allow content providers to specify different types of attributes (306) for a screen (304).

The content provider may also define pre-condition scripts (310) to be executed before displaying the relevant screen (304). For example, a pre-condition script may request authentication from the printer or login information from a user. The pre-condition script may also request information about the printer's capabilities to optimize display on the user interface of that printer.

The content provider may also define post-condition scripts to be executed upon ending display of the relevant screen. Such post-condition scripts may include an indication of what screen is to be displayed next. A post-script condition may also log with the content provider, which pieces of content were viewed with that particular screen.

Each screen may also define at least one category (308). Each category (308) may also be defined by the content provider with attributes (316), pre-condition scripts (318) and post-condition scripts (320). An example of a pre-condition for a script may be to determine if a user is authorized to view such a category based on the authentication performed for that user. Post scripts may also indicate what pieces of content within that category were either viewed or printed. The post-condition script may involve sending information back to the content provider over the cloud network.

Different dynamic content models may allow content providers to define different types of attributes (316) and other characteristics for each category. In some cases, the content provider may define sub-categories for the categories. The user may navigate between the sub-categories and any printable content within those sub-categories in a tree navigational manner as described above, Alternatively, different sub-categories may be assigned different screens (304). When a user selects a particular category (308) on one screen, that user may be navigated to a different screen (304) associated with the selected category (308). In this manner, the content provider is allowed to provide the user with a more customizable and dynamic content browsing experience.

Figure 4:
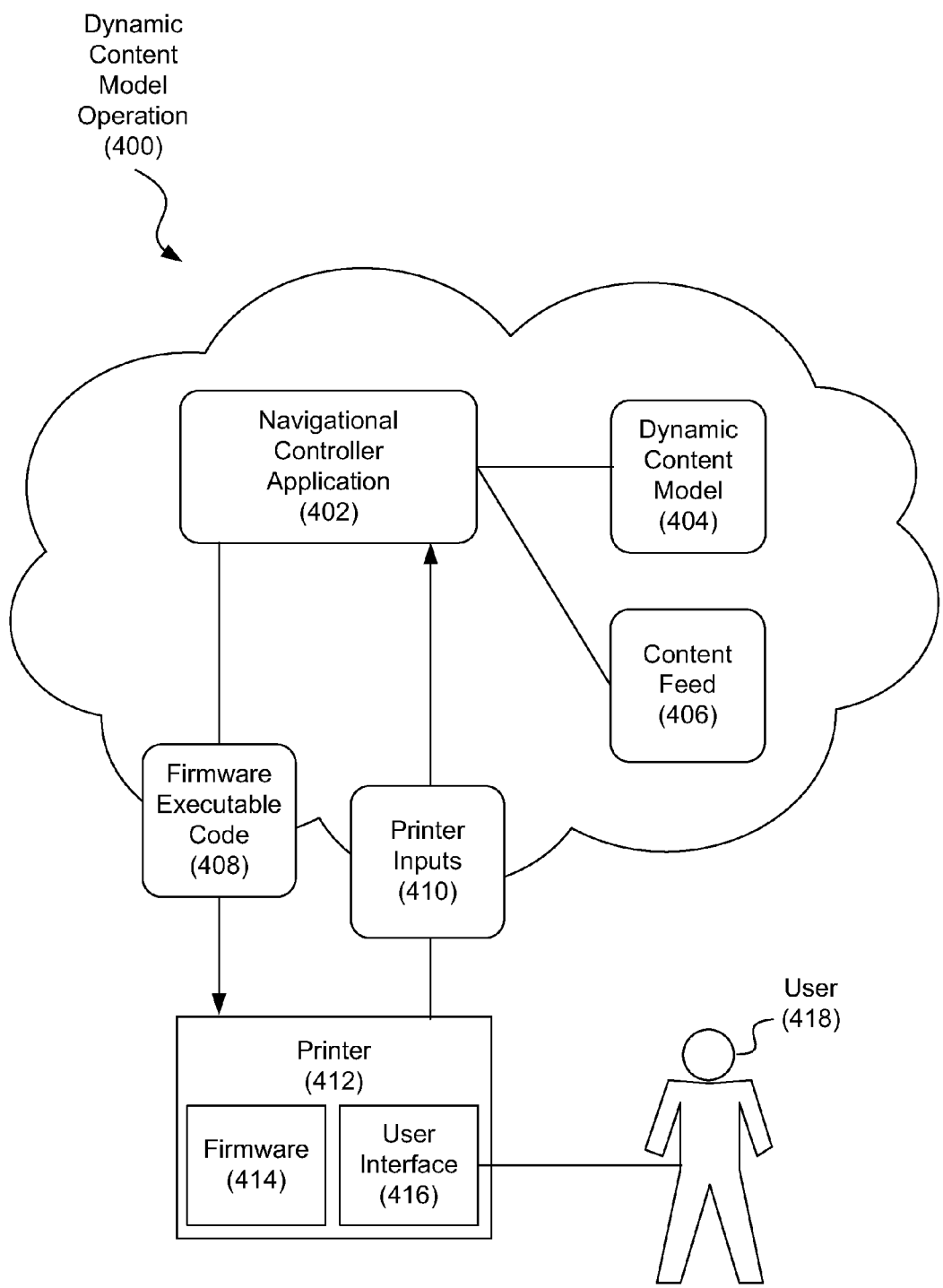
FIG. 4 is a diagram showing illustrative dynamic content model operation, according to one example of principles described herein.

FIG. 4 is a diagram showing illustrative dynamic content model operation (400). According to certain illustrative examples, the navigational controller application receives information from the dynamic content model (404) and a content feed (406). The navigational controller application (402) then creates executable code (408) and sends that code to the printer (412). The printer (412) communicates back to the navigational controller application (402) to provide further navigation for the user interface.

The content feed (406) may be formatted in XML, JavaScript Object Notation (JSON), or Atom syndication format. This content feed may be specially configured by the content provider for display in accordance with the dynamic content model (404). The navigational controller application (402) then utilizes the dynamic content model (404) and the content within the content feed (406) to create executable code (408). This executable code may be XML based and specific to the printer (412) to which the content will be sent.

Upon receiving the executable code (408) from the navigational controller application (402), the printer (412) can execute that code. During runtime, the printer (412) will send printer input (410) back to the navigational controller application (402). These printer inputs (412) may be initiated by the printer (412).

For example, the printer may inform the navigational controller application (402) of the capabilities or status of the printer (412). Additionally, the printer inputs (410) may be initiated by a user (418) through the user interface (416) of the printer (412). For example, when the user (418) selects particular categories or enters authentication information, the printer (412) will send back the appropriate data to the navigational controller application (402).

Figure 5:
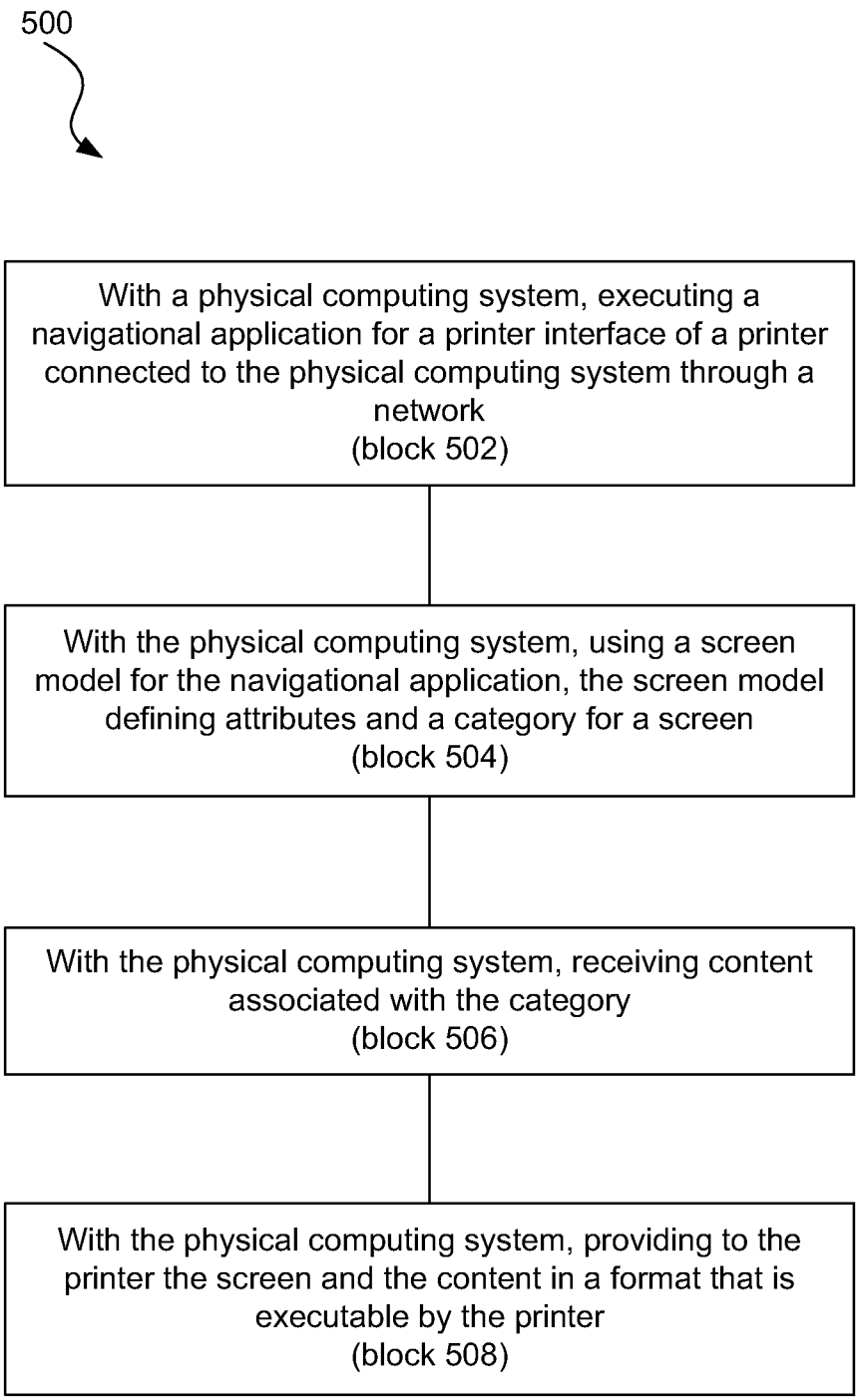
FIG. 5 is a flowchart showing an illustrative method for using a dynamic content model for a printer interface, according to one example of principles described herein.

FIG. 5 is a flowchart showing an illustrative method (500) for using a dynamic content model for a printer interface. According to certain illustrative examples, the method includes, with a physical computing system, executing (block 502) a navigational application for a printer interface of a printer connected to the physical computing system through a network, with the physical computing system, using (block 504) a content model for the navigational application, the content model defining attributes and a category for a screen. The method further includes, with the physical computing system, receiving (block 506) content associated with the category, and with the physical computing system, providing (block 508) to the printer the screen and the content in a format that is executable by the printer.

In conclusion, through use of methods and systems embodying principles described herein, content providers can format content according to a dynamic model that provides the user with dynamic navigation through that content. Thus, the content is not limited to providing content according to a static structure. This allows content providers with more freedom to provide content to users in a manner that best fits the objectives of the content provider.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for using a content model for a printer interface, the method comprising:
   with a physical computing system, executing a navigational application for a printer interface of a printer connected to said physical computing system through a network;
   with said physical computing system, using a content model for said navigational application, said content model defining attributes and a category for a screen;
   with said physical computing system, receiving content associated with said category; and
   with said physical computing system, providing to said printer said screen and said content in a format that is executable by said printer.

2. The method of claim 1, further comprising, with said printer, displaying said model screen through said printer interface.

3. The method of claim 1, wherein said content model comprises multiple screens, each screen comprising a different category, each category comprising a different set of content.

4. The method of claim 3, further comprising, with said physical computing system, receiving input from said printer and updating said screen and said content in response to said input.

5. The method of claim 4, wherein said input received from said printer indicates a change of screen.

6. The method of claim 4, wherein said input received from said printer indicates capabilities of said printer.

7. The method of claim 1, wherein said content model comprises at least one of: pre-condition code to be executed before display of said screen and post-condition code to be executed after ending display of said screen.

8. The method of claim 1, wherein said category comprises at least one of: attributes, pre-condition code to be executed b fore display of content within said category and post-condition code to be executed after ending display of content within said category.

9. A physical computing system comprising:
   at least one processor;
   a memory communicatively coupled to the at least one processor, the memory comprising computer executable code that, when executed by the at least one processor, causes the at least one processor to:
      execute a navigational application for a printer interface of a printer connected to said physical computing system through a network, the navigational application managing the display of information on said printer interface;
      use a content model for said navigational application, said content model defining a number of attributes and a number of categories for a screen displayable on said printer interface, wherein a design of said content model is based on a content provider's input associated with said attributes and said categories;
      receive content associated with said categories from said content provider; and
      transmit to said printer said screen and said content in a format that is executable by said printer.

10. The system of claim 9, wherein said content model comprises multiple screens, each screen comprising a different category, each category comprising a different set of content.

11. The system of claim 10, wherein said processor is further to receive input from said printer and update said screen and said content in response to said input.

12. The system of claim 11, wherein said input received from said printer indicates a change of screen.

13. The system of claim 11, wherein said input received from said printer indicates capabilities of said printer.

14. A printing system comprising:
   at least one processor;
   firmware for executing a specific type of executable code to operate a user interface display panel; and
   a memory communicatively coupled to the at least one processor, the memory comprising computer executable code that, when executed by the at least one processor, causes the at least one processor to:

receive a set of executable code for said firmware from a cloud computing system, the executable code to:
    display a screen derived from a content model, said screen being displayed by a navigational application running on said cloud computing system, said content model defining a number of attributes and a number of categories for a screen, wherein a design of said content model is based on a content provider's input associated with said attributes and said categories; and
    display content associated with said category, the content being provided by said content provider.

15. The printing system of claim 14, wherein said processor is further to cause said printer to print said content.

16. The printing system of claim 14, wherein said content model comprises multiple screens, each screen comprising a different category, each category comprising a different set of content.

17. The printing system of claim 14, wherein said content model comprises at least one of: pre-condition code to be executed before display of said screen and post-condition code to be executed after ending display of said screen.

18. The printing system of claim 17, wherein said category comprises at least one of: attributes, pre-condition code to be executed before display of content within said category and post-condition code to be executed after ending display of content within said category.

19. The system of claim 9, in which said content model is defined by a third party content provider.

20. The printing system of claim 14, in which said content model is defined by a third party content provider.

* * * * *

UNITED STATES PATENT AND TRADEMARK OFFICE
CERTIFICATE OF CORRECTION

PATENT NO. : 9,716,802 B2  
APPLICATION NO. : 13/445479  
DATED : July 25, 2017  
INVENTOR(S) : Kumaravel Ganesan et al.

Page 1 of 1

It is certified that error appears in the above-identified patent and that said Letters Patent is hereby corrected as shown below:

In Column 6, Line 25, in Claim 8, delete "b fore" and insert -- before --, therefor.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*